March 10, 1925.

L. D. McDOWELL

DEMOUNTABLE TIRE RIM

Filed Sept. 5, 1924

1,529,196

L. D. McDowell,
Inventor

By Clarence A. O'Brien
Attorney

Patented Mar. 10, 1925.

1,529,196

UNITED STATES PATENT OFFICE.

LEONARD D. McDOWELL, OF FLINT, MICHIGAN.

DEMOUNTABLE TIRE RIM.

Application filed September 5, 1924. Serial No. 736,078.

*To all whom it may concern:*

Be it known that I, LEONARD D. McDOWELL, a citizen of the United States, residing at Flint, in the county of Genesee and State of Michigan, have invented certain new and useful Improvements in a Demountable Tire Rim, of which the following is a specification.

This invention relates to a demountable tire rim designed for use in connection with automobile wheels.

Broadly, the invention comprises a split rim provided at the split ends with means for expanding and contracting the rim to facilitate application and removal of a tire, the expanding and contracting means being built into the rim and constituting a permanent part thereof.

It follows that it is one feature of the invention to stamp out openings at the free abutting ends to receive a pivotally mounted lever and connecting means between the same and one of the split ends so as to permit these parts to fold into the openings to eliminate objectionable projection on either side of the rim base.

It is also a feature to provide coacting means between the free end portions of the lever and the adjacent rim end which guard against circumferential expansion and thereby eliminate the pivotal connection of excessive strain.

A presentation of additional features and advantages will be made by the following description.

In the drawing:—

Figure 2:
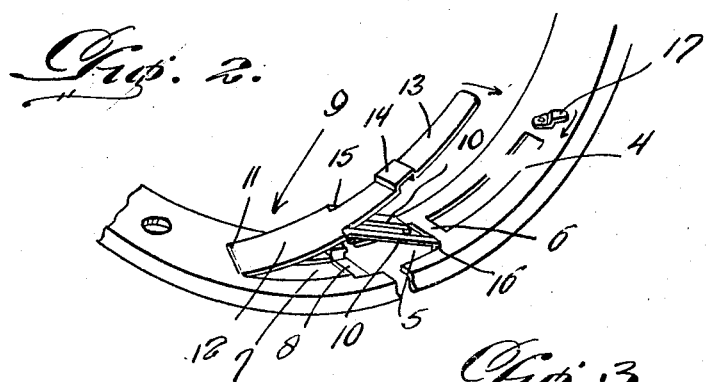
Figure 2 is an enlarged detail perspective view of the split end showing the contracting and expansion means more clearly.
Figure 3:
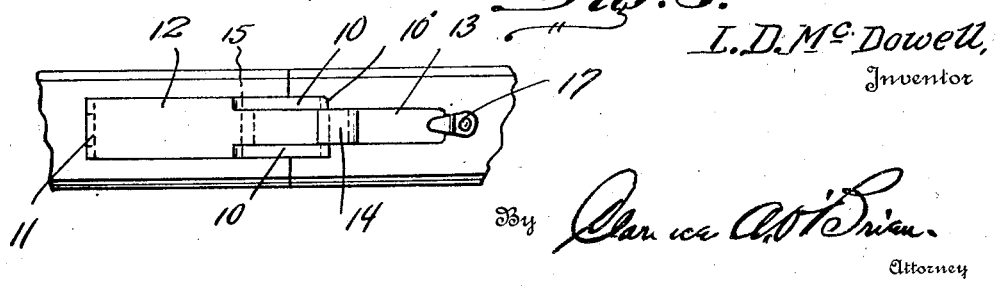
Figure 3 is a detail inner peripheral plan view.

In carrying out the invention, I provide a rim which is composed of sections 1 and 2 hingedly connected together as indicated at 3 to permit their free ends to be arranged in abutting relation. The section 1 occupies substantially three-quarters of the circumference, while the section 2 is comparatively shorter and constitutes about one-quarter of the circumference. In the present instance, the base of the section 2 is provided with an elongated slot 4 adjacent its free end as seen clearly in Figure 2. At the extremity of the free end it is provided with a notch 5 of greater width than the slot. Between the slot and notch is a cross piece 6 which serves the purpose hereafter to be described. The free end of the section 1 is provided with a slot 7 opening through the extremity. The outer end of the slot 7 is widened, being of same width as the aforesaid notch 5. To retain the rigidity, a cross piece 8 is provided to span the inner end of the slot 7.

These openings in the rim base serve to accommodate the expanding and contracting means, which as before stated, comprises a lever 9 and a connection, in the present instance comprising a pair of duplicate links 10. At 11, the lever is pivotally connected to the rim section 1. Adjacent this pivot, the inner end portion 12 is substantially wide and is adapted to occupy the correspondingly sized slot 7. From its intermediate portion to its free end, the lever is decreased in width as indicated at 13. This relatively narrow portion is provided with a depression 14 forming a seat for reception of the aforesaid cross piece 6. Abutting the shoulder formed at the juncture of the relatively wide and narrow portions of the lever and pivotally connected to the latter as at 15 are the aforesaid links 10. The links are connected at their opposite ends as at 16 to the rim section 2. The links 10 are of a length to extend beyond the notch 5 into the widened outer end of the slot 7 so as to bridge the split between the rim ends. It is yet to be pointed out that a suitably designed turn button 17 is pivoted to the rim section 2 at the inner end of the slot 4 and is adapted to be swung over the free end of the lever to retain the latter in closed position. Obviously, when the lever is not closed, the wide portion occupies the slot 7 while the free end portion of the narrow part is received in the slot 4. At this time the cross piece 6 is received in the seat 14 while the connecting links 10 are received in the notch 5 and widened outer end of the slot 7, thus transverse separation of the split ends of the rim is prevented and accidental contraction is likewise prevented.

Figure 1:
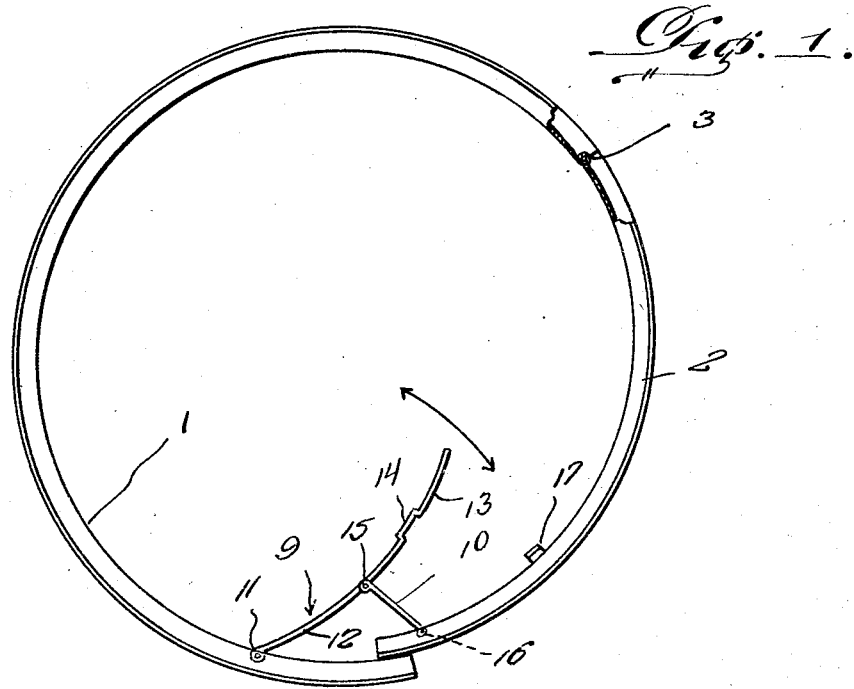
Figure 1 is a side elevation, partly in section of a demountable rim constructed in accordance with the present invention showing the same in a contracted state.

In applying a tire to the rim, the turn button 17 is disengaged from the lever and the latter is pried with a suitable instrument to start it upon its pivot if this is found necessary. Inward swinging of the lever of course swings the free end of the rim section into over-lapping relation as seen in Figure 1, making the application of the tire exceedingly easy. Pressure of the foot against the lever to swing the latter outwardly obviously serves to expand the rim to its normal state.

Having thus described the invention, what I claim is:—

A demountable tire rim comprising a split rim, one of the free ends of which is provided with an elongated slot opening through the extremity of the base portion, the other end being provided with a slot and a notch formed in its base portion and separated by a cross piece, a lever pivotally connected to the first named end and having portions swingable into said slot and notch, the lever provided intermediate its ends with a seat for reception of said cross piece, and a pair of links pivotally connected to the second named end and with the intermediate portion of said lever, said links being arranged in said notch and being swingable into said first named slot to bridge the split occurring between the abutting ends of the rim, and retaining means for maintaining the lever in closed position.

In testimony whereof I affix my signature.

LEONARD D. McDOWELL.